J. E. WILCOXEN.
MOLDING APPARATUS.
APPLICATION FILED AUG. 17, 1912.
1,059,251.
Patented Apr. 15, 1913.
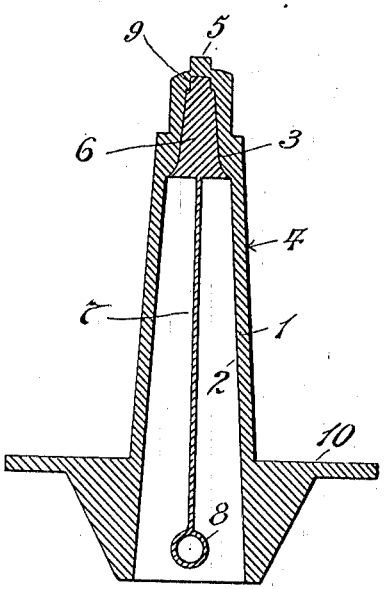
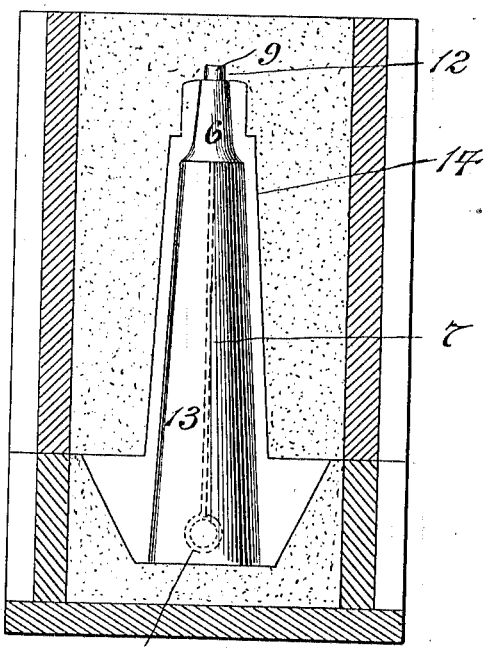

UNITED STATES PATENT OFFICE.

JOHN E. WILCOXEN, OF SOUTH BEND, INDIANA, ASSIGNOR TO THE STUDEBAKER CORPORATION, OF SOUTH BEND, INDIANA, A CORPORATION OF NEW JERSEY.

MOLDING APPARATUS.

1,059,251.  Specification of Letters Patent.  Patented Apr. 15, 1913.

Application filed August 17, 1912. Serial No. 715,597.

*To all whom it may concern:*

Be it known that I, JOHN E. WILCOXEN, a citizen of the United States of America, residing at South Bend, in the county of St. Joseph and State of Indiana, have invented certain new and useful Improvements in Molding Apparatus, of which the following is a specification.

This invention relates to an improvement in molding apparatus and is particularly adapted for use where a slender core of considerable length is employed. The difficulty encountered under these circumstances lies in locating the core accurately and maintaining it in position, and further in the fact that molding sand is so fragile that when a core or like structure is formed therefrom, it is extremely likely to be broken or displaced prior to or during the pouring so that the mold or the casting is destroyed. Indeed, the whole core is liable to fall to pieces as a result of a slight jar or unusual shock.

It is the purpose of my present invention to provide means by which the end of such a core is caused to interlock with and thus be positioned relatively to the print, the interlocking end being made of molding or other resistive material which possesses considerable rigidity. I also provide means by which the core may be reinforced throughout its length to prevent its collapse under ordinary conditions of use.

In the accompanying drawings I have illustrated my invention as applied to the manufacture of axle skeins, but various articles may be produced in the practice of my invention.

Figure 1 is a vertical axial section of a pattern in connection with which my improved core tip and reinforcing device is shown. Fig. 2 is a similar section showing a mold and core to which the tip and reinforcing device of my invention are applied, the core and tip being shown in elevation.

Referring to the drawings there is illustrated a pattern 1 of a hollow conical device as an axle skein. The pattern is formed with a central conical chamber 2, which may be termed a core chamber and which acts as a core box. The external surface 4 of the pattern is adapted to form a mold print to reproduce the external surface of the skein or other article to be cast, while the core chamber is of a shape corresponding to the inner face of the skein and the pattern is shown as formed to be used with a two-part flask to produce a mold print in the cope and a core print in the drag at the same operation. The upper end of the chamber at 3 is of reduced dimensions so that the corresponding portion or tip of the core 6 is in the form of a slender tapering peak. As a body of this form composed of the ordinary molding sand would be extremely unstable, I form this tip of material having considerable rigidity, and for use in handling the tip and as a reinforcement for the core, I provide a shank 7, which is secured to the tip and extends substantially the whole length of the core chamber; in the embodiment shown terminating in a ring 8, which may be used as a grip.

To form a socket or recess in the print to receive the end 9 of the tip and thus position and support the core, I provide an extension 5 at the upper end of the pattern. This is preferably of the same cross-sectional area as is the end 9 of the tip 6, and where the pattern to which the invention is applied is of the type shown, that is, a pattern mounted on a plate 10 and having an internal core box so as to form a mold print in the cope and a core print in the drag, I form this portion of the pattern of such dimensions that the distance from the top surface of the extension 5 to the upper end of the core chamber is equal to the thickness of the plate. Thus, when the pattern is withdrawn from the mold after tamping and the mold sections are reassembled the two sections of the pattern, *i. e.*, the core print 13 and the mold print 14 take a relative position different from that during tamping, the core moving up into the print by a distance equal to the thickness of the plate so that the end 9 of the tip 6 enters the socket or recess 12 in the mold formed by the extension 5, thus the core is accurately positioned and supported within the print and displacement of the core during pouring or as a result of any slight jar is prevented; further, the core is reinforced throughout its length by the shank 7 and the stability of the core thereby greatly increased.

While my invention has been described in connection with a pattern of a particular type for use in producing a certain kind of casting, namely, axle skein, I desire to have it understood that the invention is not limited to these details, but may be applied to various types of patterns and to the production of hollow castings of any variety.

What I claim and desire to secure by Letters Patent is:

1. A molding apparatus consisting of a pattern having an external mold print forming surface, and an internal core print forming chamber, the pattern having an external projection and the core chamber having a recess of the same cross-section and similarly placed so the corresponding parts of the mold and core register.

2. A molding apparatus consisting of a pattern having an external mold print forming surface and an internal core print forming chamber, the pattern having an external projection and the core chamber having a recess of the same cross-section and similarly placed so the corresponding parts of the mold and core register and a core tip to fit the recess and made of material of considerable rigidity.

3. A molding apparatus consisting of a pattern having an external mold print forming surface and an internal core print forming chamber, the pattern having an external projection and the core chamber having a recess of the same cross-section and similarly placed so the corresponding parts of the mold and core register and a core tip to fit the recess and made of material of considerable rigidity; and a reinforcing member for the core secured to the tip.

4. A molding apparatus consisting of a pattern having an external mold print forming surface and an internal core forming chamber, a pattern plate to which the pattern is secured, the pattern having an external projection and the core chamber having a recess of the same cross-sectional area and correspondingly placed and with corresponding points in the core chamber and mold print surfaces spaced by the thickness of the plate.

5. A molding apparatus consisting of a pattern having an external mold print forming surface and an internal core chamber, a pattern plate to which the pattern is secured, the pattern having an external projection and the core chamber having a recess of the same cross-sectional area and having their corresponding points spaced by the thickness of the plate and a core tip made of rigid material to fit the recess.

6. A molding apparatus consisting of a pattern having an external mold print forming surface and an internal core chamber, a pattern plate to which the pattern is secured, the pattern having an external projection and the core chamber having a recess of the same cross-sectional area and with the corresponding points of the surfaces of the projection and recess spaced by the thickness of the plate and a core tip made of rigid material to fit the recess, and a reinforcing member for the core secured to the tip.

7. A pattern to form a core of conical form with a tapering extremity and also to form a corresponding print in the mold to receive said core and complete the mold, in combination with a member corresponding in form with that part of the pattern adapted to form the extremity of the core, said member being made of molding material of stable quality and set into the core pattern in the space to which it conforms as stated, and a rod at one end of which said member is mounted which rod when said member is placed in the core chamber as stated is substantially in the line of the axis of said core chamber.

8. A pattern to form a core of conical form with a tapering extremity, and also to form a corresponding print in the mold to receive said core, the pattern being of a form to produce a recess in the mold with which the extremity of the core registers when the parts of the mold are brought together in combination with a member corresponding in form with that part of the pattern adapted to form the tapering extremity of the core, said member being made of molding material of stable quality and set into the core pattern in the space to which it conforms as stated, and a rod at one end of which said member is mounted which rod when said member is placed in the core pattern as stated is substantially in the line of the axis of said core pattern.

Signed by me at South Bend, county of St. Joseph, State of Indiana, this 29th day of July 1912.

JOHN E. WILCOXEN.

Witnesses:
JOHN F. COTTER,
ADOLPH COLBERG.

---

Copies of this patent may be obtained for five cents each, by addressing the "Commissioner of Patents, Washington, D. C."